United States Patent
Rotondo et al.

(10) Patent No.: US 8,344,673 B2
(45) Date of Patent: Jan. 1, 2013

(54) TORSIONAL MODE DAMPING APPARATUS

(75) Inventors: Paola Rotondo, Fasano (IT); Einar Vaughn Larsen, Charlton, NY (US)

(73) Assignee: Nuovo Pignone S.p.A., Florence (IT)

( * ) Notice: Subject to any disclaimer, the term of this patent is extended or adjusted under 35 U.S.C. 154(b) by 654 days.

(21) Appl. No.: 12/328,356

(22) Filed: Dec. 4, 2008

(65) Prior Publication Data

US 2010/0141193 A1 Jun. 10, 2010

(51) Int. Cl.
*H02P 7/00* (2006.01)
(52) U.S. Cl. ........................ 318/432; 318/434
(58) Field of Classification Search .................. 318/432, 318/434
See application file for complete search history.

(56) References Cited

U.S. PATENT DOCUMENTS

| | | | |
|---|---|---|---|
| 6,161,068 A * | 12/2000 | Kurishige et al. | 701/41 |
| 6,729,434 B2 * | 5/2004 | Stevens et al. | 180/446 |
| 7,692,322 B2 * | 4/2010 | Wakasa et al. | 290/44 |
| 2005/0072164 A1 * | 4/2005 | MacKay | 60/805 |
| 2006/0066111 A1 * | 3/2006 | Suryanarayanan et al. | 290/44 |
| 2006/0232250 A1 * | 10/2006 | Sihler et al. | 322/58 |
| 2007/0279012 A1 * | 12/2007 | Sihler | 322/20 |

FOREIGN PATENT DOCUMENTS

| | | |
|---|---|---|
| EP | 2 073 375 A1 | 4/2008 |
| EP | 2 073 374 A1 | 6/2009 |

\* cited by examiner

*Primary Examiner* — Kawing Chan
(74) *Attorney, Agent, or Firm* — Potomac Patent Group PLLC

(57) ABSTRACT

A torsional-mode damping system includes a torque sensor, a torsional damper connected to the torque sensor, a VFD controller connected to the torsional damper, and a VFD converter connected to the VFD controller, the VFD converter being configured to control an electric power supplied to the electric motor based on VFD signals generated by the VFD controller, the VFD signals being modified by a torque-correcting signal so as to dampen torsional vibrations at a natural frequency of a compression train.

20 Claims, 3 Drawing Sheets

TORSIONAL MODE DAMPING APPARATUS

BACKGROUND OF THE INVENTION

1. Field of the Invention

The embodiments disclosed herein relate generally to machine drive systems and more particularly to damping of torsional vibrations in such systems.

2. Description of the Related Art

Prime movers (e.g., gas turbines or electrical motors) are typically connected to their respective loads (e.g., electric generators or compressors) by a mechanical shaft, which may exhibit resonance at one or more critical frequencies excited by the power drive and/or by the load. If a torque component at a critical frequency is generated, then the shaft will experience torque oscillations, which can lead to an increase in fatigue and reduction in the life of the shaft. In extreme cases, if such modes are excited to the point of exceeding the design capacity of any component in the train (especially a coupling that that may be considered the weakest component in the system), severe damage to the system may result due to torsional fatigue, leading to down time and expensive repairs. Moreover, for turbo rotor trains with gears, high radial and lateral vibrations in the gearbox may be observed due to the fact that torsional and lateral motions of the gears may be coupled to one another in the presence of large oscillatory angular motion of the train.

Torsional vibrations are oscillatory angular shaft motions superimposed on the steady-state shaft speed so as to twist various sections of the shaft as well as machine couplings. As already noted, high torsional vibrations may be destructive and result in high lateral vibration at the gearbox. Severe torsional vibrations may be present during the operation of a system with the only indication of a problem being gear noise or coupling wear. Some typical effects of uncontrolled torsional vibration may be a failed coupling, a broken shaft, a worn gear, a fractured gear tooth, and more.

Excitation of torsional natural frequencies may come from many sources. From the electrical drive, the source of the torque components can be voltage harmonics present due to the nature of output modulators in voltage converters or due to the presence of other current or voltage disturbances within the electrical network in connection with the machine. Another main cause for torsional issues in electrical motor driven shaft assemblies are air-gap torque harmonics generated by the electrical drive system.

As those of ordinary skill in the applicable arts understand, the torsional characteristics of these systems vary as a function of the stiffness and inertia of the train. While some torsional properties of the system may be changed, generally the system inertia cannot be easily modified as needed, particularly if torsional issues develop when the project development is completed (i.e., during string tests or during the commissioning phase). Conventional turbo machinery drive trains driven or assisted by an electric motor that include a Variable Frequency Driver (VFD) require specific considerations in the design stage over conventional constant speed equipment. Furthermore, variable-frequency drives are notorious sources of torsional vibration problems due to the torque ripple generated on the motor shaft. One way to reduce these torsional vibrations is to carefully design the entire compressor train from a torsional standpoint with the proper selection of couplings, gearbox and rotors in order to prevent torsional and/or torsio-flexural issues. Nevertheless, optimization of control-loop parameters for train torsional behavior has not been observed as a successful option to address the noted torsional issues.

It would therefore be desirable to develop turbo machinery drive trains driven or assisted by an electric motor that include an alternative way to reduce or smooth the harmful effect of alternating torsional stress acting directly on the source of the excitation with no or minimum impact on the hardware of the system.

BRIEF SUMMARY OF THE INVENTION

One or more of the above-summarized needs or others known in the art are addressed by torsional-mode damping systems to reduce a torque component at a critical frequency in an output torque of a compression train including a compressor, a gas turbine connected to the compressor by a shaft, and an electric motor connected to the compressor by a geared shaft. These torsional-mode damping systems including a torque sensor; a torsional damper connected to the torque sensor; a VFD controller connected to the torsional damper; and a VFD converter connected to the VFD controller, the VFD converter being configured to control an electric power supplied to the electric motor based on VFD signals generated by the VFD controller and the VFD signals being modified by a torque-correcting signal configured to dampen torsional vibrations at a natural frequency of the compression train.

Compressor trains according to embodiments of the disclosed inventions also include a compressor coupled to a gear box; a turbine connected to the compressor by a shaft; an electric motor connected to the compressor by a shaft coupled to the gear box; a torque sensor configured to generate a torque signal based on a measurement of a torque of the shaft coupled to the gear box; a VFD converter configured to control an electric power supplied to the electric motor; and a VFD controller connected to the VFD converter, the VFD controller being configured to generate VFD signals to drive the VFD converter, the VFD controller further including a torsional damper connected to the torque sensor, the torsional damper being configured to generate a torque-correcting signal based on the torque signal from the torque sensor, the VFD signals being modified by the torque-correcting signal from the torsional damper so as to dampen torsional vibrations at a natural frequency of the compression train.

The above brief description sets forth features of the various embodiments of the present invention in order that the detailed description that follows may be better understood, and in order that the present contributions to the art may be better appreciated. There are, of course, other features of the invention that will be described hereinafter and which will be for the subject matter of the appended claims.

In this respect, before explaining several embodiments of the invention in detail, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

Further, the purpose of the foregoing Abstract is to enable a patent examiner and/or the public generally, and especially scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
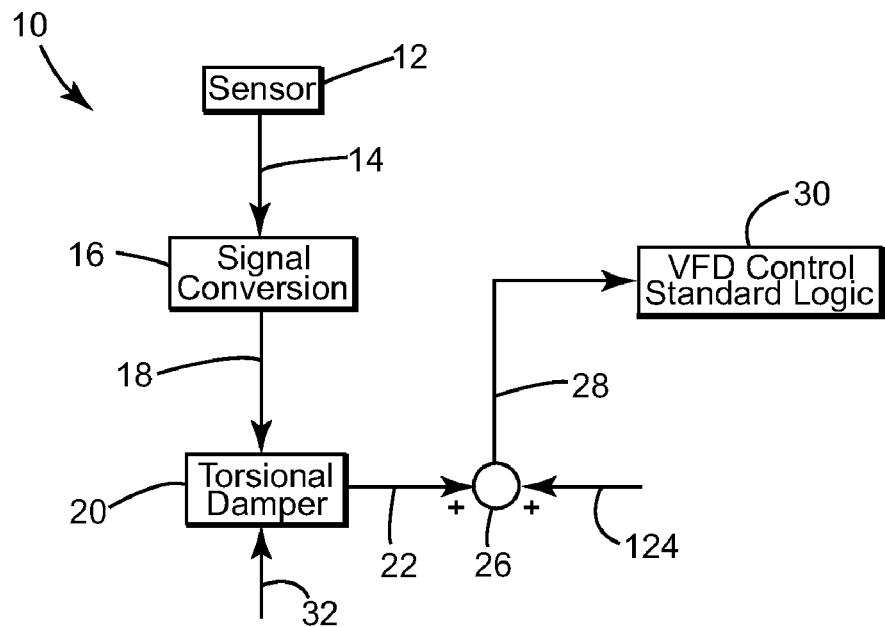
FIG. 1 illustrates a diagram of a torsional-mode damping system according to an embodiment of the subject matter disclosed herein.

Embodiments disclosed herein relate generally to machine drive systems and more particularly to damping of torsional vibrations in such systems. By further processing of a shaft feedback signal of a geared compressor/turbine/motor train, a torque-correcting signal is generated in a torsional-mode damping controller and added to a VFD torque reference signal prior to converting the same to current references in a VFD control of the train in order to dampen torsional vibrations at a specified natural frequency. Because the disclosed systems operate as an outer damping control loop, i.e., acting on the VFD signals, it can be applied as a retrofit to existing systems, thus improving the protection and performance of existing system without the need of substantial capital investments. Referring now to the drawings, wherein like reference numerals designate identical or corresponding parts throughout the several views, several embodiments of the improved torsional-mode damping systems will be described.

FIG. 1 illustrates a diagram of a torsional-mode damping system 10 according to an embodiment of the subject matter disclosed. As understood by those of ordinary skill in the applicable arts, the torsional-mode damping system 10 may be used in various industrial applications, including, but not being limited to the Oil and Gas industry, in which VFD systems that include grid rectifiers, DC links, and inverters are commonly used.

As shown, the torsional-mode damping system 10 includes a torque sensor 12 configured to sense the torque of a geared train shaft and to generate a signal 14 representative of the sensed torque. The signal 14 is then supplied to a signal converter 16 to rescale the signal 14 as a torsional damper input signal 18 to a torsional damper 20. Although the torsional-mode damping system 10 of FIG. 1 is illustrated as having the signal converter 16, other embodiments may not include the signal converter 16 or the same may be an integral part of the torsional damper 20. In embodiments not including the signal converter 16, the torsional damper 20 is configured to handle the signal 14 produced by the sensor 12 without the need of further processing. The torsional damper input signal 18 is then processed by the torsional damper 20 to generate a torque-correcting signal 22 to dampen torsional vibrations at a specified natural frequency of a geared turbine/compressor/motor train, in part by adding the torque-correcting signal 22 to a VFD torque-reference signal 124 at a signal summation element 26, the output of the signal summation element 26 becoming a modified VFD torque reference signal 28 fed to a VFD standard controller 30. As shown in FIG. 1, when commissioning test are performed of a compressor train device containing the torsional-mode damping system 10, a test signal 32 may be supplied to the torsional damper 20, the test signal 32 being generated by known devices, including, but not being limited to an oscillator or signal analyzer.

Figure 2:
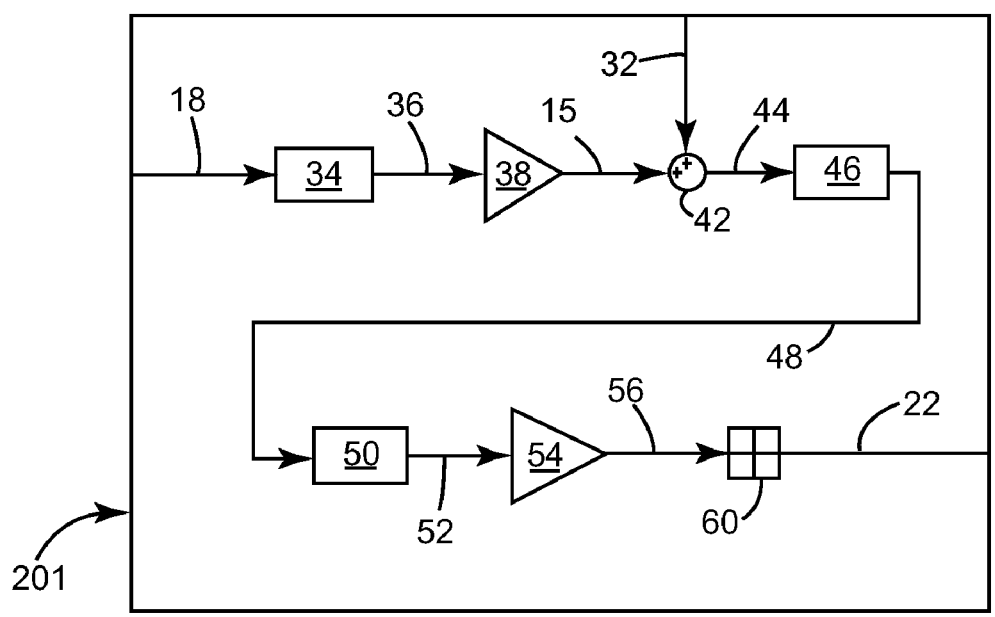
FIG. 2 illustrates a diagram of an exemplary embodiment of the torsional damper of FIG. 1 according to an embodiment of the subject matter disclosed herein.

FIG. 2 illustrates a diagram of an exemplary embodiment of the torsional damper 20 of FIG. 1 according to an embodiment of the subject matter disclosed herein. It should be understood by those of ordinary skill that FIG. 2 is simply an exemplary embodiment and should not be considered as limiting the disclosed inventions in any way.

In the exemplary embodiment of FIG. 2 the torsional damper 201 includes a first band-pass filter 34 having an adaptable order between zeroeth and second order centered at the torsional frequency to be damped. In operation, the first band-pass filter 34 filters the torsional damper input signal 18 and feeds the filtered signal 36 to a first gain amplifier 38 to control the magnitude of the filtered signal 36 before the output 15 of the first gain amplifier 38 is supplied to a signal summation element 42. When performing commissioning tests, the generated test signal 32 is supplied to the signal summation element 42, as shown in FIG. 2. The output signal 44 of the signal summation element 42 is then supplied to a second band-pass filter 46, whose frequency is centered at +15% of the torsional frequency to be damped. An additional phase-shifting filter 50 near 90 degrees having a gain of one may be used for further tuning the output 48 of the second band-pass filter 46. As further illustrated in FIG. 2, the output signal 52 of the phase-shifting filter 50 is fed to a gain block 54 that may be of an opposite sign depending upon the details of the geared compressor train implementation. Finally, in order to generate the torque-correcting signal 22, the output 56 from the gain block 54 is passed through a saturation block 60 configured to limit torque-correcting signal 22 to a desired level. The range of the saturation block 60 may be set in a range of 1-5% of the shaft torque on the electric machine base and the saturation speed limit values may be selected based in the details of the implementation. As already explained, the torque-correcting signal 22 from the torsional damper 20 is then added to the VFD torque reference signal prior to converting to current references inside the VFD control 30 to generate VFD Converter commands to damp the detected torsional vibration at the specified natural frequency.

The transfer function of the illustrated filters may vary from zeroeth to second order, depending on the specific application, the individual gains may be selected to achieve a desired level of damping, and set limits may be selected so as to prevent or minimize excessive response. Thus, the torsional-mode damping system 10 disclosed herein uses a shaft feedback signal 14 that becomes the input of the torsional damper 20, which processes the same to create the torque-correcting signal 22.

Figure 3:
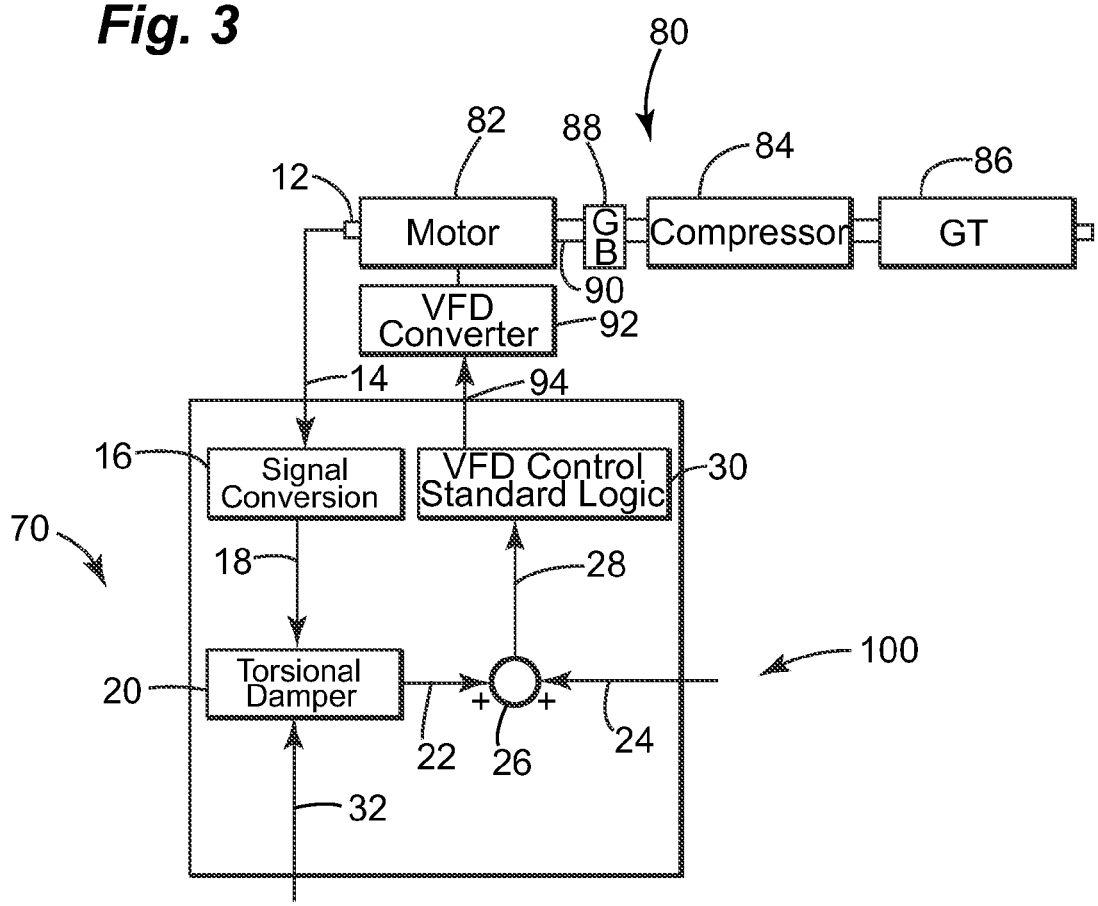
FIG. 3 illustrates a torsional-mode damping system on a variable frequency driver of a turbo machinery drive train with an electric motor according to an embodiment of the subject matter disclosed.

FIG. 3 illustrates a torsional-mode damping system 70 applied to a turbo machinery drive train 80 that includes an electric motor 82, a compressor 84, and a gas turbine 86. As shown, the compressor 84 is coupled to the electric motor 82 by a gearbox 88 and a coupling or shaft 90, the electric motor 82 being controlled by a VFD converter 92. As those of ordinary skill in the applicable arts will understand it, the industrial application schematically illustrated in FIG. 3 is commonly used in the Oil and Gas industry, in which a VFD system will include a grid rectifier, a DC link, and an inverter (not shown in FIG. 3). In particular FIG. 3 describes the application where the torsional-mode damping system 70 is implemented in a VFD controller 100, as further explained below.

In the application shown in FIG. 3, the torsional-mode damping system 70 includes a torque sensor 12 configured to sense the torque of the geared train shaft 90 and to generate signals 14 representative of the sensed torque. Although other types of sensors are envisioned, the torque sensor 12 in the illustrated embodiment is an encoder located on the non-driven end of the electric motor 82. In use, the torque sensor 12 generates encoder pulses that are representative of the torque on train shaft 90 and the torque-mode damping system 70 is implemented in the VFD controller 100 of the illustrated system.

Torque signals 14 are then supplied to the signal converter 16 to rescale the signal 14 as the torsional damper input signal 18 to the torsional damper 20. Although the torsional-mode damping system 70 of FIG. 3 is illustrated as having the signal converter 16, other embodiments may not include the signal converter 16 or the same may be an integral part of the torsional damper 20. In embodiments not including the signal converter 16, the torsional damper 20 is configured to handle the signal 14 produced by the sensor 12 without the need of further processing. The torsional damper input signal 18 is then processed by the torsional damper 20 to generate the torque-correcting signal 22 to dampen torsional vibrations at the specified natural frequency of the geared turbine/compressor/motor train, by in part adding the torque-correcting signal 22 to the VFD torque-reference signal 24 at the signal summation element 26, the output of the signal summation element 26 becoming the modified VFD torque reference signal 28 fed to the VFD standard controller 30, which generates signals 94 to drive the VFD converter 92. As shown in FIG. 3, when commissioning test are performed of the compressor train device containing the torsional-mode damping system 10, the test signal 32 may be supplied to the torsional damper 20, the test signal 32 being generated by known devices, including, but not being limited to an oscillator or signal analyzer.

Figure 4:
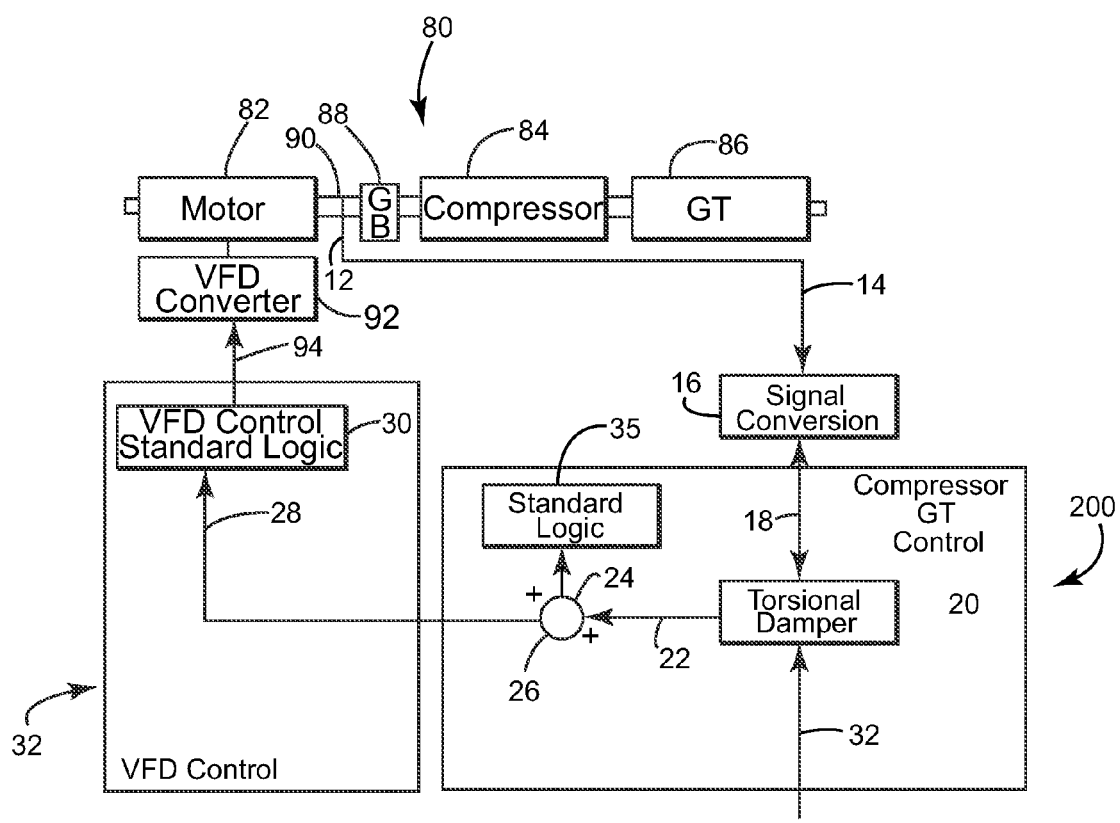
FIG. 4 illustrates a torsional-mode damping system on a compressor/gas turbine controller of a turbo machinery drive train with an electric motor according to an embodiment of the subject matter disclosed.

FIG. 4 illustrates a torsional-mode damping system 110 as applied to a compressor/turbine controller 200 according to another embodiment of the subject matter disclosed. The turbo machinery drive train 80 of FIG. 4 also includes the electric motor 82, the compressor 84, and the gas turbine 86. As shown, the compressor 84 is coupled to the electric motor 82 by the gearbox 88 and the coupling or shaft 90, the electric motor 82 being controlled by the VFD converter 92. As those of ordinary skill in the applicable arts will understand it, the industrial application schematically illustrated in FIG. 3 is commonly used in the Oil and Gas industry, in which a VFD system will include a grid rectifier, a DC link, and an inverter (not shown in FIG. 4). In particular FIG. 4 describes the application where the torsional-mode damping system 110 is implemented in the compressor/turbine controller 200, as further explained below.

Similar to FIG. 3, the system of FIG. 4 also includes the torque sensor 12 to sense the torque of the geared train shaft 90 and to generate signals 14 representative of the sensed torque. Although other types of sensors are envisioned, the torque sensor 12 in the illustrated embodiment is an encoder located on the driven end of the electric motor 82. In use, the torque sensor 12 generates encoder pulses that are representative of the torque on train shaft 90 and the torque-mode damping system 10 is implemented in a compressor/gas turbine controller 200 of the illustrated system.

As shown in FIG. 4, torque signals 14 are supplied to the signal converter 16 to rescale the signal 14 as the torsional damper input signal 18 to the torsional damper 20 in the compressor/gas turbine controller 200. Although the torsional-mode damping system 10 of FIG. 3 is illustrated as having the signal converter 16, other embodiments may not include the signal converter 16 or the same may be an integral part of the torsional damper 20. In embodiments not including the signal converter 16, the torsional damper 20 is configured to handle the signal 14 produced by the sensor 12 without the need of further processing. The torsional damper input signal 18 is then processed by the torsional damper 20 to generate the torque-correcting signal 22 to dampen torsional vibrations at the specified natural frequency of the geared turbine/compressor/motor train, by in part adding the torque-correcting signal 22 to the VFD torque-reference signal 24, supplied by standard logic module 35, at the signal summation element 26, the output of the signal summation element 26 becoming the modified VFD torque reference signal 28 fed to the VFD standard controller 30, which generates signals 94 to drive the VFD converter 92. As also shown in FIG. 4, when commissioning test is performed of the compressor train device containing the torsional-mode damping system 10, the test signal 32 may be supplied to the torsional damper 20, as already explained.

In summary, thus, FIGS. 3 and 4, as just explained, show two different exemplary implementation strategies of the subject matter disclosed herein. That is, the torsional damper algorithm may be implemented inside a VFD control hardware (as illustrated in FIG. 3) or inside a Compressor/GT controller (as illustrated in FIG. 4). FIG. 3 shows the implementation of the torsional damper algorithm in VFD control hardware. In particular the train speed regulator is in the VFD control hardware and provides the torque reference signal to the VFD controller. In the VFD controller the torsional damper added algorithm calculates in real time the torque correcting signal to be added to the torque reference signal (inside the VFD logics). FIG. 4 shows the implementation of the torsional damper algorithm in the GT/compressor controller. In particular the train speed regulator is in the Compressor/GT controller (indicated as "standard logics") and generate the torque reference signal. In the GT/Compressor controller the torsional damper added algorithm calculates in real time the torque correcting signal to be added to the torque reference signal to generate the final torque command to the VFD (no changes in VFD logics and hardware).

One of the advantageous features of the torque-mode damping systems summarized hereinabove and their equivalents is the fact that it is possible to implement the same in existing controller hardware, thus allowing for upgrades of existing controllers in various industrial applications, including, but not being limited to, Oil and Gas applications, without requiring an additional hardware and/or making mechanical changes to the train shaft (no changes in the scope of supply). Such an advantageous features will then not only allow for the development of improved gas compressor trains but also to damp detected torsional vibrations at a specified natural frequency in order to reduce the torsional vibration levels below the material endurance limits in existing system by performing the noted upgrades.

The above-summarized exemplary embodiments of the disclosed subject matter have been implemented experimentally and modeled numerically for validation purposes. In the experiments, a string of tests was carried out on a specific Oil and Gas compressor train made up of a gas turbine, a centrifugal compressor, a gearbox, a flexible coupling, and a variable speed synchronous electric motor. In these tests, torque shaft, currents and voltages at the motor terminals, critical shaft response (torque ripple at 55% nominal motor torque) on the coupling, excitation of the train shaft first natural frequency, and torsional vibrations higher than the coupling material endurance limits were measured. In the numerical modeling, motor electrical variables were used to calculate air-gap torques to drive the simulations and a torsional modal model was developed to simulate the response on the coupling at the first torsional mode. Comparisons of calculated and measured shaft torques provided favorable validations of the torsional modal model, which also incorporated a torsional damper function implementation.

Simulation results showed that the torsional damper provided more than 5-to-1 reduction of the alternating shaft torque at the first torsional mode frequency. From the experiments, implementation of the torsional damper system in the variable frequency driver reduced unwanted torque vibrations to levels higher than a 5-to-1 reduction of the alternating shaft torque at the first torsional mode frequency resulting in a reduction of the torsional vibration levels below the material endurance limits, thus resulting on an effective solution of the noted problems by allowing for the restriction of torsional energy to the part of the excitation spectrum where the torsional frequency exists. In addition, as already noted, implementation in controllers (hardware) already existing is possible without adding additional hardware and/or making mechanical changes on the train shaft (no changes in the scope of supply). While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

What is claimed is:

1. A torsional-mode damping system to reduce a torque component at a critical frequency in an output torque of a compression train including a compressor, a gas turbine connected to the compressor by a shaft, and an electric motor connected to the compressor by a geared shaft, the torsional-mode damping system comprising:
a torque sensor configured to generate a torque signal based on a measurement of a torque of the geared shaft;
a torsional damper connected to the torque sensor, the torsional damper being configured to generate a torque-correcting signal based on the torque signal from the torque sensor;
a signal summation element connected to the torsional damper and configured to add the torque-correcting signal to a variable frequency device (VFD) reference signal to produce a modified VFD reference signal;
a VFD controller connected to the signal summation element, the VFD controller being configured to generate VFD signals modified by the torque-correcting signal from the torsional damper; and
a VFD converter connected to the VFD controller, the VFD converter being configured to control an electric power supplied to the electric motor based on the VFD signals generated by the VFD controller, wherein the VFD signals modified by the torque-correcting signal are configured to dampen torsional vibrations at a natural frequency of the compression train.

2. The torsional-mode damping system according to claim 1, wherein the torsional damper further comprises a first band-pass filter adaptable between zeroeth and second orders.

3. The torsional-mode damping system according to claim 2, wherein the torsional damper further comprises a second band-pass filter having a frequency centered at about ±15% of the natural frequency of the compression train.

4. The torsional-mode damping system according to claim 3, wherein the torsional damper further comprises a phase-shifting filter substantially near 90 degrees.

5. The torsional-mode damping system according to claim 4, wherein the torsional damper further comprises a saturation block configured to limit the torque-correcting signal in a range of about 1 to about 5% of the geared shaft torque.

6. The torsional-mode damping system according to claim 1, wherein the torsional damper is disposed in a VFD control hardware of the compression train.

7. The torsional-mode damping system according to claim 6, wherein a train speed regulator of the compression train is disposed in the VFD control hardware, the train speed regulator being configured to provide a torque reference signal to the VFD controller.

8. The torsional-mode damping system according to claim 7, wherein the torque-correcting signal is calculated in real time and added to the torque reference signal.

9. The torsional-mode damping system according to claim 1, wherein the torsional damper is disposed in a compressor/turbine controller of the compression train.

10. The torsional-mode damping system according to claim 9, wherein a train speed regulator of the compression train is disposed in the compressor/turbine controller, the train speed regulator being configured to provide a torque reference signal to the VFD controller.

11. The torsional-mode damping system according to claim 10, wherein the torque-correcting signal is calculated in real time and added to the torque reference signal.

12. The torsional-mode damping system according to claim 1, wherein a ratio of the torsional vibration at the natural frequency of the compression train without the torsional-mode damping system to the torsional vibration at the natural frequency of the compression train with the torsional-mode damping system is higher than 5 to 1.

13. A compression train, comprising:
a compressor coupled to a gear box;
a turbine connected to the compressor by a shaft;
an electric motor connected to the compressor by a shaft coupled to the gear box;

a torque sensor configured to generate a torque signal based on a measurement of a torque of the shaft coupled to the gear box;

a VFD converter configured to control an electric power supplied to the electric motor; and a VFD controller connected to the VFD converter, the VFD controller being configured to generate VFD signals to drive the VFD converter, the VFD controller further comprising:

a torsional damper connected to the torque sensor, the torsional damper being configured to generate a torque-correcting signal based on the torque signal from the torque sensor, and a signal summation element connected to the torsional damper and configured to add the torque-correcting signal to a variable frequency device reference signal to produce a modified VFD reference signal;

wherein the VFD signals are modified by the torque-correcting signal from the torsional damper so as to dampen torsional vibrations at a natural frequency of the compression train.

14. The torsional-mode damping system according to claim 13, wherein the torsional damper is disposed in a VFD control hardware of the compression train.

15. The torsional-mode damping system according to claim 14, wherein a train speed regulator of the compression train is disposed in the VFD control hardware, the train speed regulator being configured to provide a torque reference signal to the VFD controller.

16. The torsional-mode damping system according to claim 15, wherein the torque-correcting signal is calculated in real time and added to the torque reference signal.

17. The torsional-mode damping system according to claim 13, wherein the torsional damper is disposed in a compressor/turbine controller of the compression train.

18. The torsional-mode damping system according to claim 17, wherein a train speed regulator of the compression train is disposed in the compressor/turbine controller, the train speed regulator being configured to provide a torque reference signal to the VFD controller.

19. The torsional-mode damping system according to claim 18, wherein the torque-correcting signal is calculated in real time and added to the torque reference signal.

20. The compression train according to claim 13, wherein a ratio of the torsional vibration at the natural frequency of the compression train without the torsional damper to the torsional vibration at the natural frequency of the compression train with the torsional damper is higher than 5 to 1.

* * * * *